United States Patent

[11] 3,547,011

[72] Inventor Melville T. Farquhar
    Bon Air, Va.
[21] Appl. No. 740,012
[22] Filed April 22, 1968
    Division of Ser. No. 654,140, July 18, 1967,
    Pat. No. 3,403,837
[45] Patented Dec. 15, 1970
[73] Assignee Reynolds Metals Company
    Richmond, Va.
    a corporation of Delaware

[54] METHOD OF MAKING DISHLIKE CONTAINER
    8 Claims, 8 Drawing Figs.
[52] U.S. Cl. ........................................ 93/36,
    93/51, 72/294, 93/1
[51] Int. Cl. ........................................ B31b 1/00
[50] Field of Search ........................... 93/1D, 36,
    51; 72/294, 325

[56] References Cited
UNITED STATES PATENTS
2,579,753  12/1951  Norquist ..................... 72/294
2,808,192  10/1957  Raisen ........................ 93/36X Primary Examiner—H. A. Kilby, Jr.
Attorney—Glenn, Palmer, Lyne, Gibbs & Thompson ABSTRACT: This disclosure relates to a dishlike container means made of multiple layer sheet means having a metallic foil layer defining its inside surface layer and an adjacent layer made of a material capable of being charred. Such dishlike container means has downwardly concave rolled flange means defining top peripheral edge means defining top peripheral edge means of its side wall means arranged so that such metallic foil layer protects such adjacent layer arranged therebeneath from heat rays traveling substantially normally toward the inside surface of the dishlike container means. This disclosure also relates to blanks for making such dishlike container means and to an improved method of making rolled flange means in multilayer sheet means of the character mentioned.

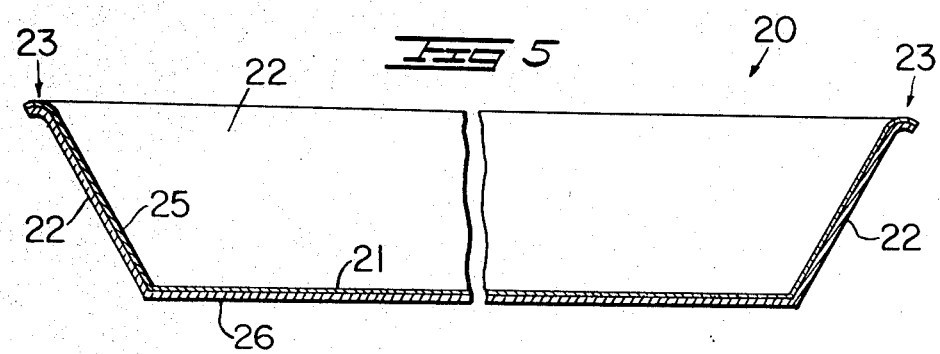
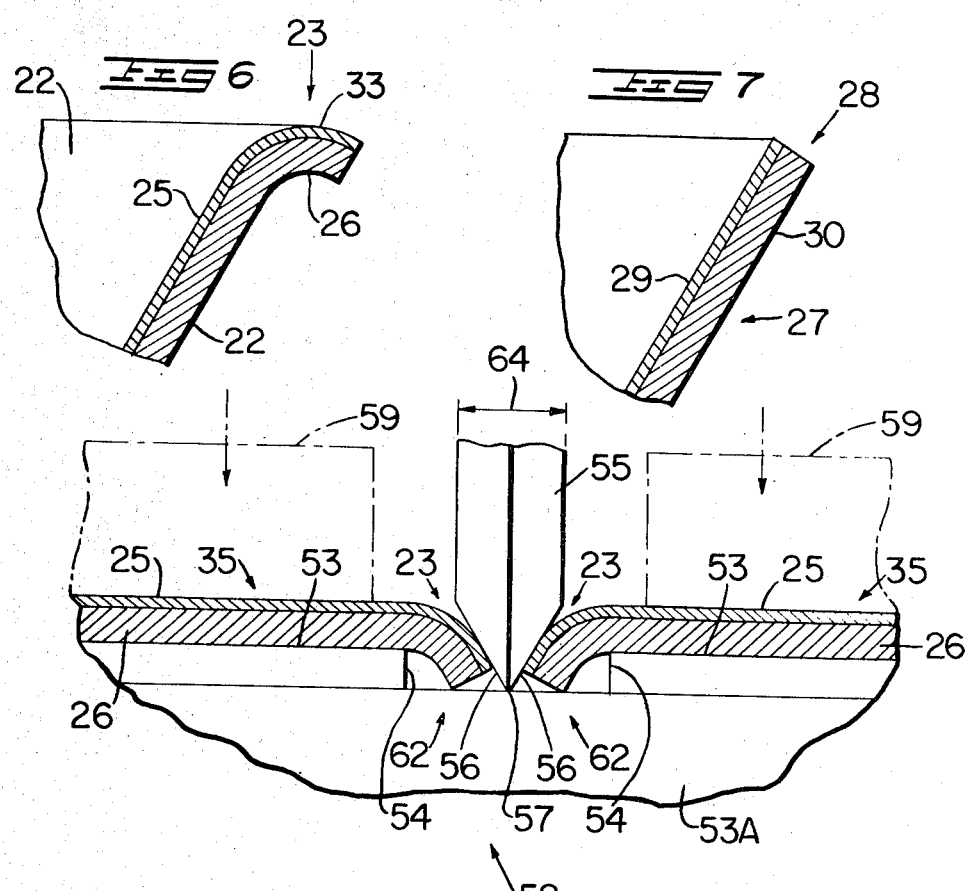

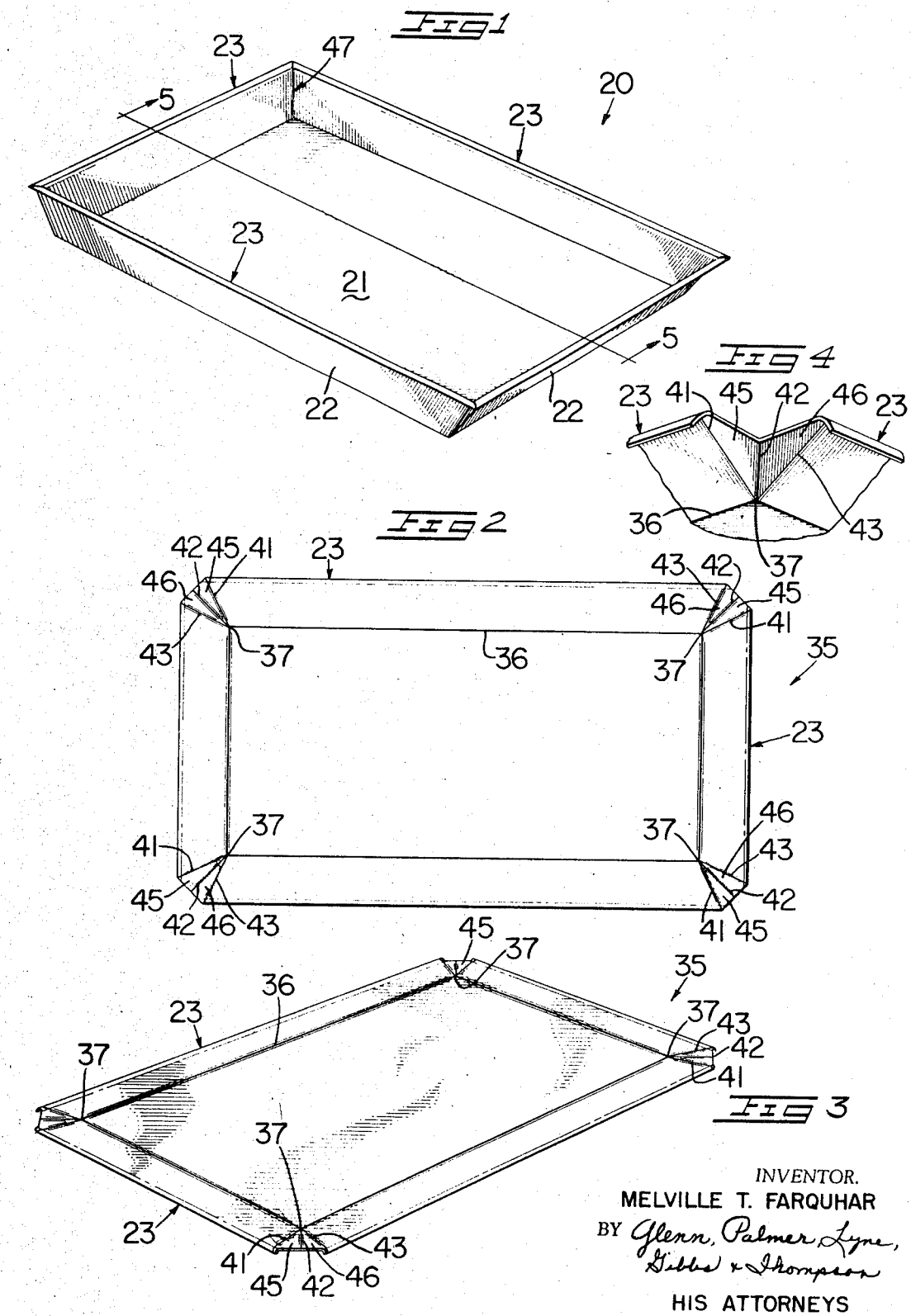

METHOD OF MAKING DISHLIKE CONTAINER

This application is a divisional patent application of its copending parent Pat. application, Ser. No. 654,140, filed Jul. 18, 1967, U.S. Pat. No. 3,403,837, and is assigned to the same assignee to whom the parent application is assigned.

BACKGROUND OF THE INVENTION

Many food products are presently sold in disposable dishlike containers, often in a frozen condition, in various stages of preparation ranging from precooked to uncooked. It is then generally necessary to place each dishlike container and its food product in an oven for heating and/or cooking. To keep the cost of such dishlike containers down they are generally made of paperboard, or the like, with at least the layer defining the inside surface thereof being made of metallic foil.

Most presently used dishlike containers made of multilayer sheet means of the character mentioned above have side wall means which terminate in an upper edge which is exposed to heat rays emitting from an upper heating element of an electric oven, for example, which cause the paperboard portion thereof to char. Such charring is very undesirable because it materially weakens the dishlike container and is also very unsightly for a container containing a food product.

SUMMARY

This invention provides an inexpensive disposable dishlike container means made of multilayer sheet means which includes layer means made of paperboard, or the like, and a metallic foil layer defining its inside surface means. The dishlike container means of this invention has rolled flange means extending about the top periphery of its side wall means arranged so that its layer means of paperboard is shielded beneath its inside surface defining layer of metallic foil from heat rays traveling from a heat source arranged above such container means to prevent undesirable charring. This invention also provides an improved method of making such rolled flange means in multilayer sheet means of the type particularly adapted to be used in forming such dishlike container means. In addition, this invention provides improved and inexpensively formed blanks for making dishlike container means of the character mentioned.

Other details, uses, and advantages of this invention will become apparent as the following description of the embodiment thereof presented in the accompanying drawing proceeds.

BRIEF DESCRIPTION OF THE DRAWING

The accompanying drawing shows present preferred embodiments of this invention, in which:

FIG. 1 is a perspective view illustrating one exemplary embodiment of improved dishlike container means of this invention having downwardly concave rolled flange means defining top peripheral edge means of its side wall means;

FIG. 2 is a plan view of the blank used to make the container means of FIG. 1 after defining downwardly concave rolled flange means about its peripheral edge;

FIG. 3 is a perspective view of the blank of FIG. 2 shown to particularly highlight the arrangement of its peripheral rolled flange means;

FIG. 4 is an enlarged fragmentary perspective view of a corner of the blank as shown in FIG. 3 particularly illustrating the manner of folding portions of the blank adjoining each corner to enable forming the container of FIG. 1;

FIG. 5 is a sectional view on the line 5—5 of FIG. 1 with the center portion of the container means broken away;

FIG. 6 is an enlarged fragmentary sectional view particularly illustrating the downwardly concave rolled flange means provided about the top periphery of the side wall means of the container means of FIG. 1;

FIG. 7 is a fragmentary view similar to FIG. 6 illustrating the side wall means of a conventional container means; and FIG. 8 is a view with parts in section and parts broken away illustrating the manner of forming rolled edge means in a multiple layer sheet means to define peripheral rolled flange means therein.

DESCRIPTION OF ILLUSTRATED EMBODIMENT

In the exemplary embodiment of this invention illustrated in the drawing, an improved dishlike container means or dishlike container designated generally by the numeral 20 is shown. Dishlike container 20 has substantially planar bottom wall means or a substantially planar bottom wall designated by the numeral 21 and side wall means shown as a substantially continuous side wall 22 suitably fastened to bottom wall 21 and extending upwardly in a diverging or outwardly flaring manner from the peripheral edge means of bottom wall 21. The side wall 22 has downwardly concave rolled flange means designated generally by the numeral 23 defining its top peripheral edge means.

The dishlike container 20 is made of multiple layer sheet means which in this example of the invention is made of two layers comprising a metallic foil layer designated by the numeral 25 defining the inside surface means of dishlike container 20 and an adjacent layer made of a material capable of being charred when exposed to heat rays from a heat source, see FIGS. 5 and 6. The above mentioned adjacent layer of material capable of being charred comprising dishlike container 20 of this example of the invention is made of paperboard and designated by the numeral 26.

The dishlike container 20 is of the type which is particularly adapted to contain a product such as a frozen food product, for example, and the container and its food product is generally placed in a heating oven so that the food product can be heated and/or cooked as the case may be.

Normally, in present day ovens a maximum heat is emitted from heating elements provided adjacent the top of the oven to bring the oven up to a predetermined or preselected temperature. As seen in FIG. 7, presently used dishlike containers have side wall means 27 which terminate in top peripheral edge means as shown at 28. Side wall means 27 is generally comprised of a metallic foil layer 29 and a paperboard layer 30 the top edge of which is essentially unprotected. Upon placing such presently used containers in a heating oven the heat rays emitted from the heating elements located adjacent the top of the oven travel toward the dishlike container and tend to char and often burn the paperboard layer.

The improved dishlike container means 20 of this invention enables the use of the previously mentioned multiple layer sheet means comprised of the metallic foil layer 25 which is similar to the metallic foil layer 29 of presently used containers as well as the use of the paper layer 26 which is similar to the paper layer 30 of present dishlike containers; however, in the dishlike container 20 of this invention the paper layer 26 is protected beneath the layer of metallic foil 25 by the unique manner of forming and arranging its substantially continuous side wall 22. In particular, side wall 22 is formed so that it diverges outwardly from bottom wall 21 at an obtuse angle with the inside surface of bottom wall 21 and the downwardly concave rolled flange 23 is provided so that the paperboard layer 26 is protected beneath the metallic layer 25 from heat rays traveling substantially normally toward the inside surface of the substantially planar bottom wall 21, see FIGS. 1 and 6. The portion of metallic foil layer comprising rolled flange 23 is preferably formed in a smooth upwardly convex configuration designated by the numeral 23 and as indicated above completely protects the terminal edge of the paperboard layer 26.

Dishlike container 20 can be formed in any suitable manner and made from any suitable inexpensive foldable material having metallic foil comprising one exposed surface thereof. It is preferably formed from single piece container blank 35 which is provided with rolled flange means or rolled edge 23 about its peripheral edge, see FIG. 2. Blank 35 of this example is made of two layers comprised of metallic foil layer 25 and paperboard layer 26 which are suitably laminated together in a known manner. The metallic foil layer or sheet 25 is preferably an aluminum-containing metallic foil which may remain plain or may be suitably colored, embossed, or imprinted as desired.

Although partially formed blank 35 has been illustrated and described as being defined of two layers comprised of metallic foil layer 25 and paperboard layer 26, it will be appreciated that blank 35 may be defined of any number of layers, provided that the layer defining the inside surface of the resulting assembled container means made from suck blank is made of metallic foil and formed so as to have rolled flange means extending about the periphery of the side wall means in the resulting assembled container means.

Even with the provision of the metallic foil layer on both exposed surfaces of a multiple later sheet means which utilizes intermediate layer means made of a material capable of being charred, it will be appreciated that the unique rolled flange means provided about the peripheral top edge of the side wall means in the resulting container means formed as taught by this invention protects the exposed edge means of the layer means capable of being charred from heat rays coming from the upper heating elements of an associated heating oven.

The partially formed blank 35 is scored and suitably fastened together to define the resulting dishlike container 20. The exemplary blank 35 of this invention has a substantially rectangular peripheral outline with a small triangular portion having been cut away from each corner.

Blank 35 has first score means arranged in a continuous substantially rectangular pattern inwardly of its peripheral edge and designated by the numeral 36. Score means 36 defines peripheral edge means of bottom wall 21 in the resulting dishlike container 20 and also defines lower edge means of the substantially continuous outwardly flaring side wall means 22. As will be apparent from the drawing the portion of blank 35 arranged outwardly of score means 36 is folded upwardly thereabout and suitable means is provided adjacent the corners of rectangular score means 36 to assure provision of side wall means 22 in a smooth manner in the resulting container 20.

The means provided in blank 35 to assure side wall 22 is formed as desired comprises second score means comprised of a plurality of sets of score means symmetrically arranged adjacent each corner of blank 35 and extending from an associated inwardly arranged point designated by the numeral 37 and provided adjacent each corner of blank 35. The above mentioned points 37 define the four corner points of score line 36.

Each set of score means extending outwardly from each corner point 37 is comprised of a plurality of three outwardly extending score lines designated by the numerals 41, 42, and 43. The score lines 41 and 42 define a triangular area designated by the numeral 45 therebetween while score lines 42 and 43 define another triangular area designated by the numeral 46 therebetween. The score lines 41—43 enable the inside metallic foil surfaces of areas 45 and 46 to be folded toward each other, as shown in FIG. 4, and then against each other to define continuous side wall 22 of resulting container 20 having adjoining rectangular side portions which adjoin each other on a single line at each corner designated generally by the numeral 47, see FIG. 1.

The size and configuration of triangular portions 45 and 46 define the outwardly flaring configuration of side wall 22. Also, triangular portions 45 and 46 may be fastened together and against an outer portion of the side wall 22 in any suitable manner such as by use of adhesive means, or the like.

The triangular portions 45 and 46 are folded against each other in a common plane so that their terminal exposed edges adjoin each other. Such exposed edges are then tucked under a portion of rolled flange 23 to provide complete protection therefor and thereby prevent charring.

The dishlike container 20 of this example of the invention has a substantially rectangular peripheral outline and is made from an approximately rectangular blank 35; however, it will be appreciated that the dishlike container 20 may have any desired configuration. Also, the manner of defining and fastening the side wall means in position may be achieved in any desired manner.

Thus, depending on the desired configuration of the overall dishlike container, suitable score means may be provided in an associated blank made of multiple layer sheet means of the character described above to define the substantially planar bottom wall and adjoining foldably connected side wall means. However, irrespective of the configuration of the final dishlike container its top peripheral edge means is provided with downwardly concave peripheral rolled flange or edge means to protect the layer means capable of being charred beneath a surface layer made of metallic foil.

A present preferred method of forming the rolled edge means 23 in a suitable multilayer sheet means will now be described in connection with FIG. 8 of the drawings wherein a suitable multiple layer sheet of stock is held in position on supporting die means and cut or severed to define two exemplary sections. Each section thus severed will be completely formed about its outer periphery to define a blank 35; therefore, merely for ease of description, each exemplary fragmentary section shown in FIG. 8 will be designated by the numeral 35. The metallic foil layer and paperboard layer of each section 35 will be designated by the numerals 25 and 26 respectively, as previously.

The multiple layer sheet means of stock is supported on die means designated generally by the numeral 52 and having substantially planar supporting surface means or substantially planar supporting surface portions 53 supported on a base portion 53A. Die means 52 also has transverse surface means shown as a pair of spaced apart transverse surfaces each designated by the numeral 54 arranged transverse to planar supporting surface 53. In this example of the invention the transverse surfaces 54 are arranged perpendicular to supporting surface 53.

Cutting means shown as a cutting knife 55 is provided for cutting the sheet means of stock used to define the two sections 35. The knife means 55 has a pair of cooperating inclined surface means each designated by the numeral 56 symmetrically arranged and terminating in a cutting edge designated by the numeral 57.

The original single piece of multiple layer sheet stock is placed on the planar supporting surface 53 so that a portion thereof to be formed with rolled flange means 23 is arranged adjacent to, in this example is shown as being arranged between, transverse surface means 54. The original sheet of multiple layer sheet means is also placed in position so that the metallic foil layer 25 is arranged upwardly and is adapted to be engaged first upon relatively moving the cutting means 55 against the portion of the single piece multiple layer blank to be severed.

After placing the sheet of blank stock in position as described above, holding means is provided for holding such stock firmly against the substantially planar surface means 53. The holding means may comprise any suitable means and may comprise a pair of holding blocks each designated by the numeral 59 arranged on opposite sides of cutting knife 55 and adapted to engage and compress the blank stock against an associated section of planar supporting surface 53.

The cutting means 55 is urged against that portion of the original multiple layer sheet which is arranged between transverse surfaces 54 causing the knife edge 57 to sever such sheet and causing each inclined surface means 56 to simultaneously urge an associated severed end means shown at 62 toward and against an associated transverse surface means 54 to thereby form an associated rolled edge 23. Each rolled edge 23 thus formed is downwardly concave toward its associated transverse surface means 54.

The cutting means 55 has a width shown at 64 at the base of its inclined or downwardly tapering wedge-shaped surface means 56 which is correlated with the distance between the transverse surfaces 54 and the overall thickness of the multiple layer sheet stock used to form blank 35 so as to assure the provision of a rolled edge or flange 23 once the cutting means 55 is relatively urged against such sheet stock.

The above described method is used to form a rolled edge means or rolled flange 23 substantially about the entire periphery of a sheet of blank stock in the manner illustrated in FIG. 2 of the drawing. Thus, upon assembling the construction of FIG. 2, the resulting dishlike container means 20 is defined which has peripheral downwardly concave rolled edge means extending about the entire outer periphery of its side wall means.

Although the wedge-shaped knife means 55 illustrated in FIG. 7 of the drawings is shown as simultaneously forming rolled edge means in a pair of blanks 35, it will be appreciated that the wedge-shaped knife means 55 may be used to define a rolled edge means in a sheet of multiple layer blank stock in which the peripheral edges thereof would be trimmed away and discarded as scrap leaving a main portion which has the configuration as shown in FIG. 2.

Terms such as "bottom wall," "side wall," "upwardly," "downwardly," and the like, have been used in this disclosure of the invention for ease of description and to describe the various component parts as illustrated in the drawing and such terms should not be considered as limiting the scope of this invention in any way.

Thus, it is seen that an improved dishlike container means has been provided by this invention.

Further, this invention provides an improved method of making rolled flange means in multiple layer sheet means which is particularly adapted to be used in forming inexpensive disposable dishlike containers for use in cooking and/or heating a food product.

In addition, this invention provides improved blanks for making such dishlike container means, or the like.

While present preferred embodiments of this invention, and methods of practicing the same, have been illustrated and described, it will be recognized that this invention may be otherwise variously embodied and practiced within the scope of the following claims.

I claim:
1. A method of forming rolled edge means in multiple layer sheet means comprised of a metallic foil layer defining an outside surface thereof and an adjacent layer made of a material capable of being charred, said method comprising the steps of, providing die means having substantially planar supporting surface means and transverse surface means arranged transverse to and adjoining said planar supporting surface means along common forming edge means, providing cutting means for cutting said sheet means, said cutting means having inclined surface means terminating in a cutting edge, placing said sheet means with its adjacent layer supported against said supporting surface means and so that a portion of said sheet means to be formed with rolled edge means extends outwardly of said forming edge means holding said sheet means firmly against said planar supporting surface means to prevent relative movement therebetween, and forming said sheet means be urging said cutting means against said portion of said sheet means causing said cutting edge to sever said sheet means by first severing said metallic foil layer and then said adjacent layer and causing said inclined surface means to simultaneously urge end means of said sheet means thus severed toward and against the upper portion of said transverse means to simultaneously bend both said metallic foil layer and said adjacent layer and permanently form an associated rolled edge means having a substantially uniform thickness throughout which is substantially equal to the thickness of said sheet means and which is downwardly concave toward said transverse surface means.

2. A method as set forth in claim 1 comprising the further step of assembling said multiple layer sheet means to define dishlike container means having substantially planar bottom wall means and side wall means foldably connected to peripheral edge means of said bottom wall means so that said rolled edge means defines peripheral downwardly concave edge means for said side wall means.

3. A method as set forth in claim 2 in which said step of assembling said sheet means comprises the steps of providing score means in said sheet means, folding said sheet means using said score means to help define the configuration of said dishlike container means, and fastening the thus folded sheet means in position.

4. A method as set forth in claim 1 in which, said step of providing die means comprises providing die means having a pair of spaced apart transverse surface means with each transverse surface means defining an associated forming edge means at its junction with said planar supporting surface means, said step of providing cutting means having inclined surface means comprises providing cutting means comprised of a pair of cooperating inclined surface means defining a tapering wedge-shaped knife means terminating in said cutting edge, said placing step comprises placing said sheet means on said supporting surface means so that said portion extends completely across the space between said pair of transverse means, and said forming step comprises moving said wedge-shaped knife means so that each of said inclined surface means simultaneously urges an associated severed end means of said sheet means around an adjoining forming edge means and against the upper portion of an adjoining transverse surface means to form an associated rolled edge means.

5. A method as set forth in claim 4 in which, said adjacent layer made of a material capable of being charred comprises a layer of paperboard and said forming step comprises bending both said metallic foil layer and said adjacent layer so that said metallic foil layer has a substantially permanently formed outwardly convex configuration.

6. A method as set forth in claim 4 in which said step of providing wedge-shaped knife means comprises providing said knife means having a width at the base thereof which is correlated with the distance between said transverse surface means and the thickness of said sheet means to assure the provision of said rolled edge means.

7. A method as set forth in claim 4 in which said step of providing die means comprises the step of providing said pair of transverse surface means in said die means each arranged to extend perpendicular to an associated portion of said supporting surface means to assure the provision of said rolled edge means even with spring back of said multiple layer sheet means.

8. A method as set forth in claim 1 in which said adjacent layer made of a layer capable of being charred comprises a paperboard layer laminated against said metallic foil layer and said forming step comprises bending both said metallic foil layer and said paperboard layer so that said metallic foil layer has a substantially permanently formed outwardly convex configuration.